United States Patent
Karasawa et al.

(10) Patent No.: US 7,825,360 B2
(45) Date of Patent: Nov. 2, 2010

(54) OPTICAL APPARATUS PROVIDED WITH CORRECTION COLLAR FOR ABERRATION CORRECTION AND IMAGING METHOD USING SAME

(75) Inventors: Masayoshi Karasawa, Tokyo (JP); Akihiko Yoshikawa, Tokyo (JP); Kazuhiro Hayashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 63 days.

(21) Appl. No.: 12/150,536

(22) Filed: Apr. 29, 2008

(65) Prior Publication Data

US 2008/0310016 A1 Dec. 18, 2008

(30) Foreign Application Priority Data

May 2, 2007 (JP) ............................. 2007-121870

(51) Int. Cl.
G02B 7/04 (2006.01)
G02B 27/40 (2006.01)
G02B 27/64 (2006.01)

(52) U.S. Cl. ................. 250/201.2; 250/208.1; 359/383; 359/384; 359/391

(58) Field of Classification Search ............... 250/201.2, 250/216, 208.1; 359/383, 385, 388, 384, 359/391
See application file for complete search history.

(56) References Cited

U.S. PATENT DOCUMENTS

| | | | |
|---|---|---|---|
| 4,958,920 A * | 9/1990 | Jorgens et al. ............... 359/392 |
| 5,483,079 A | 1/1996 | Yonezawa | |
| 6,043,475 A | 3/2000 | Shimada et al. | |
| 6,473,228 B1 | 10/2002 | Toshimitsu | |
| 2002/0036823 A1 | 3/2002 | Shimada et al. | |
| 2002/0191502 A1 | 12/2002 | Hirai | |
| 2005/0024718 A1* | 2/2005 | Sase et al. ................... 359/368 |
| 2005/0068614 A1* | 3/2005 | Yoneyama et al. .......... 359/368 |

(Continued)

FOREIGN PATENT DOCUMENTS

JP 2003-043374 A 2/2003

(Continued)

OTHER PUBLICATIONS

Partial European Search Report dated Jul. 29, 2008, issued in a counterpart European Search Report.

(Continued)

*Primary Examiner*—Georgia Y Epps
*Assistant Examiner*—Francis M Legasse, Jr.
(74) *Attorney, Agent, or Firm*—Holtz, Holtz, Goodman & Chick, PC

(57) ABSTRACT

This is an optical apparatus provided with an objective with a correction collar for correcting aberration due to an error in the optical thickness of a piece of cover glass comprising a focusing mechanism for changing a distance between the objective and the sample, an optical thickness detecting unit for detecting the optical thickness of the cover glass, an operating unit for calculating the amount of aberration correction, based on the optical thickness of the cover glass detected by the optical thickness detecting unit, a driver unit for driving a correction collar, based on the amount of aberration correction calculated by the operating unit and an imaging sensor for forming the image of the sample that passes through the objective.

17 Claims, 14 Drawing Sheets

U.S. PATENT DOCUMENTS

2006/0157637 A1 7/2006 Karasawa et al.
2008/0055718 A1 3/2008 Kono et al.

FOREIGN PATENT DOCUMENTS

JP 2003-158666 A 5/2003
JP 2003-161887 A 6/2003
WO WO 2005/096062 A1 10/2005

OTHER PUBLICATIONS

An Extended European Search Report dated Sep. 26, 2008, issued in a counterpart European Application.

* cited by examiner

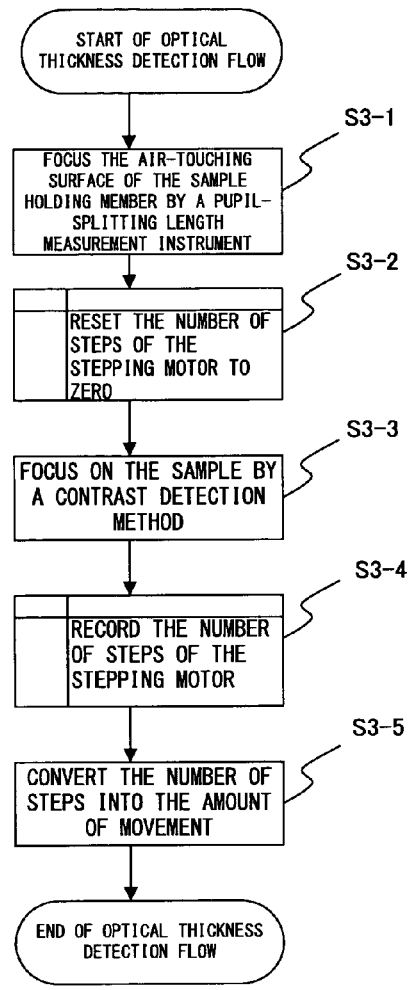
F I G. 4 B

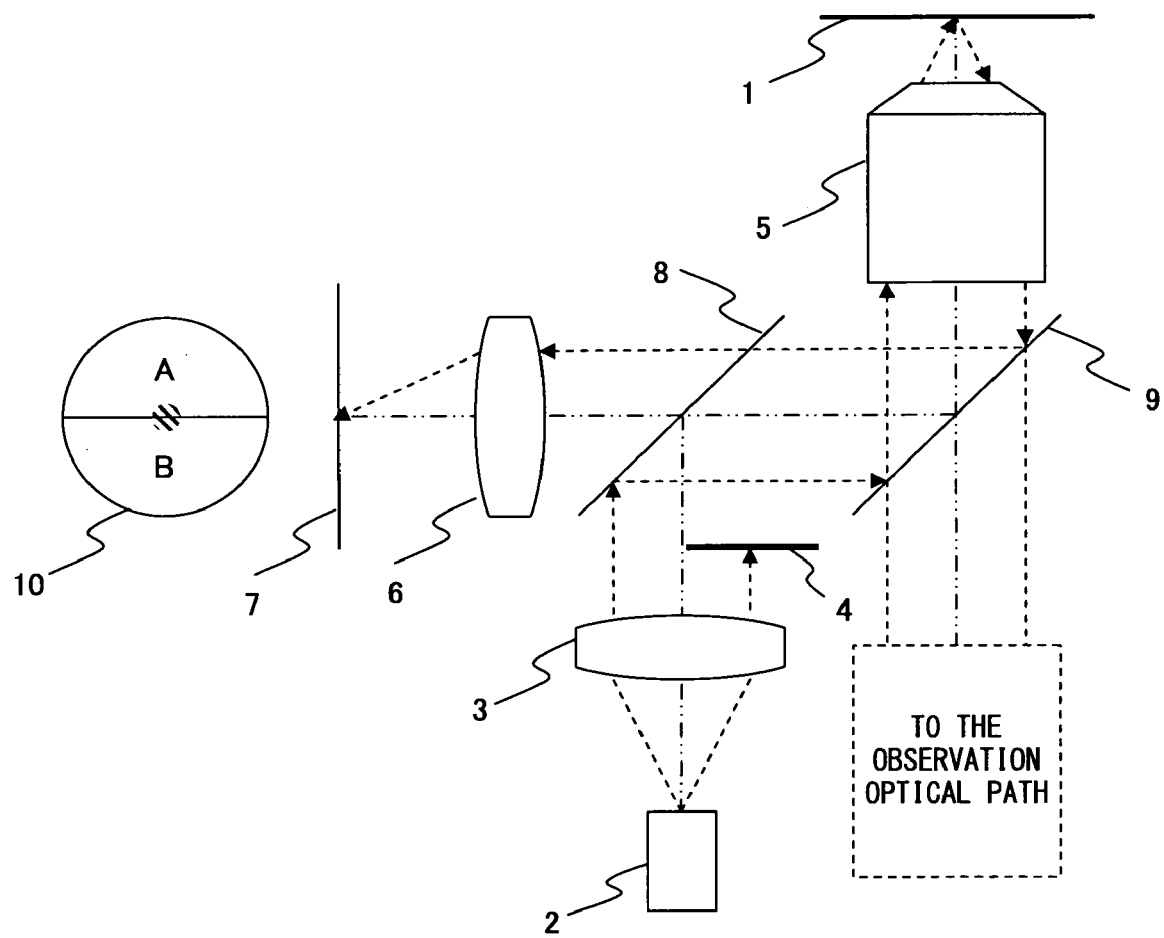
F I G. 5 A

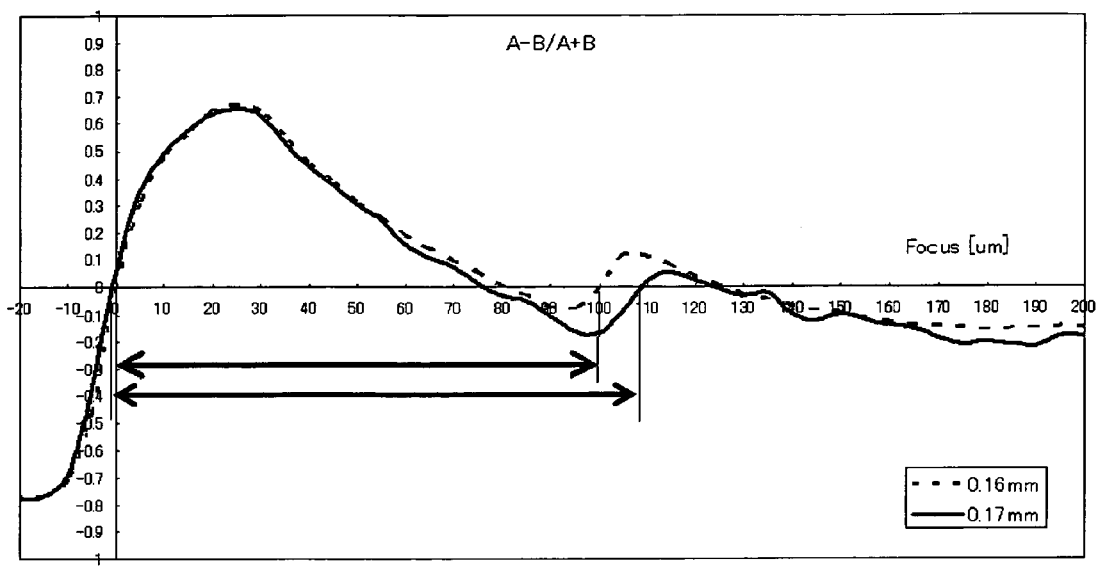
F I G. 6

OPTICAL APPARATUS PROVIDED WITH CORRECTION COLLAR FOR ABERRATION CORRECTION AND IMAGING METHOD USING SAME

CROSS-REFERENCE TO RELATED APPLICATION

This application claims the benefits of Japanese Application No. 2007-121870, filed on May 2, 2007, the contents of which are incorporated by this reference.

BACKGROUND OF THE INVENTION

1. Field of the Invention

The present invention relates to an optical apparatus provided with an enlarged imaging optical apparatus such as a microscope and the like, and more particularly to an optical apparatus for automatically correcting various aberrations caused by the difference of the thickness of a medium for holding a sample, such as cover glass, a glass petri dish, a plastic container and the like, interposed between an objective and the specimen.

2. Description of the Related Art

Generally, a large magnification objective, such as a microscope and the like, is designed in such a way as to obtain a clear image when observing a fixed specimen using a piece of cover glass whose thickness and refractive index is regulated. Therefore, when observing using a piece of cover glass whose thickness and refractive index largely deviate from the standard ones, various aberrations occur to be unable to obtain a clear image. The larger the numerical aperture of an objective is, the more remarkable this tendency is.

Therefore, in some objectives, a part of a lens system constituting the objective can be moved along the optic axis. Such an objective is called an objective with a correction collar, which includes the following lenses. (1) A dry objective with a large numerical aperture in which various aberrations remarkably occur due to the uneven thickness of cover glass. (2) An objective supposed to use a piece of cover glass or a plastic container whose thickness widely differs, for example, in a fairly wide range of 0.17 mm to 2 mm. When using such objectives with a correction collar, a clear image can be obtained against various thickness of cover glass, compared with an objective without a correction collar.

However, actually it is not easy to correct aberration using such a microscope objective and only a skilled observer can find a position where an image can be the clearest. This is because a focus position also changes simultaneously as various aberrations change when moving a part of lenses for aberration correction. When the focus position changes, the image blurs. Since in a blurred image, the correction state of aberration cannot be caught, the observer of the microscope has to always repeat aberration correction and focusing. Therefore, the change in the amount of aberration cannot be continuously caught.

Japanese Patent Application No. 2002-169101 discloses a technology for automatically correcting the change of the focus position caused when moving the correction collar in order to solve the above-described problem. However, since the aberration cannot be automatically corrected, the convenience of the observer is not fully satisfied.

Japanese Patent Application No. 2001-083428 discloses an example of a television camera obtaining the image of an observed object mounted on a stage, the television camera outputting the image as electric signals, a first control unit driving a correction lens driver unit, based on the electric signals from the television camera to move a spherical aberration correction lens in a microscope device disposing the spherical aberration correction lens between the objective and an image forming unit and capable of correcting the spherical aberration by moving the spherical aberration correction lens along the optic axis. Since in this method, the correction lens driver unit is driven on the basis of the obtained image of an observed object, an exposure time for image acquisition become long especially when a weak fluorescent image is targeted. When repeated image picking is necessary, a far longer time is necessary. It is also necessary to apply excitation light to a sample in order to form an image, which gives damage due to light to the sample.

SUMMARY OF THE INVITATION

According to one aspect of the present invention, an optical apparatus provided with an objective with a correction collar for correcting aberration due to an error in the optical thickness of a sample holding member comprises an optical thickness detecting unit for detecting the optical thickness of the sample holding member, an operating unit for calculating the amount of aberration correction, based on the optical thickness of the sample holding member, a driver unit for driving the correction collar, based on the amount of aberration correction calculated by the operating unit, a focusing mechanism for changing a distance between the objective and the sample, and an imaging sensor for forming the image of the sample that passes through the objective.

According to another aspect of the present invention, an optical apparatus provided with an objective with a correction collar for correcting aberration due to an error in the optical thickness of a piece of cover glass comprises a focusing mechanism for changing a distance between the objective and the sample, an optical thickness detecting unit for detecting the optical thickness of the cover glass, an operating unit for calculating the amount of aberration correction, based on the optical thickness of the cover glass detected by the optical thickness detecting unit, a driver unit for driving a correction collar, based on the amount of aberration correction calculated by the operating unit and an imaging sensor for forming the image of the sample that passes through the objective. The focusing mechanism detects a first focus position on which the objective side surface of the cover glass is focused and a second focus position on which the sample surface of the cover glass is focused. The optical thickness detecting unit calculates the optical thickness of the cover glass, based on a difference between the first and second focus positions. The operation unit calculates amount of aberration correction, based on the difference between the first and second focus positions obtained by the focusing mechanism. The driver unit drives the correction collar, based on the amount of aberration correction.

According to another aspect of the present invention, a method for imaging a sample using an optical apparatus provided with an objective with a correction collar for correcting aberration due to an error in the optical thickness of a sample holding member comprises the steps of detecting the optical thickness of the sample holding member, calculating the amount of aberration correction, based on the optical thickness, driving the correction collar, based on the amount of aberration correction, changing a distance between the objective and the sample and forming the image of the sample that passes through the objective.

BRIEF DESCRIPTION OF THE DRAWINGS

FIG. 4B shows an example of the thickness detection flow of the sample holding member (passive).

FIG. 5A explains a pupil splitting mechanism (1).

FIG. 6 is a graph showing the detection result by the pupil splitting method.

DESCRIPTION OF THE PREFERRED EMBODIMENTS

The First Preferred Embodiment

Figure 1:
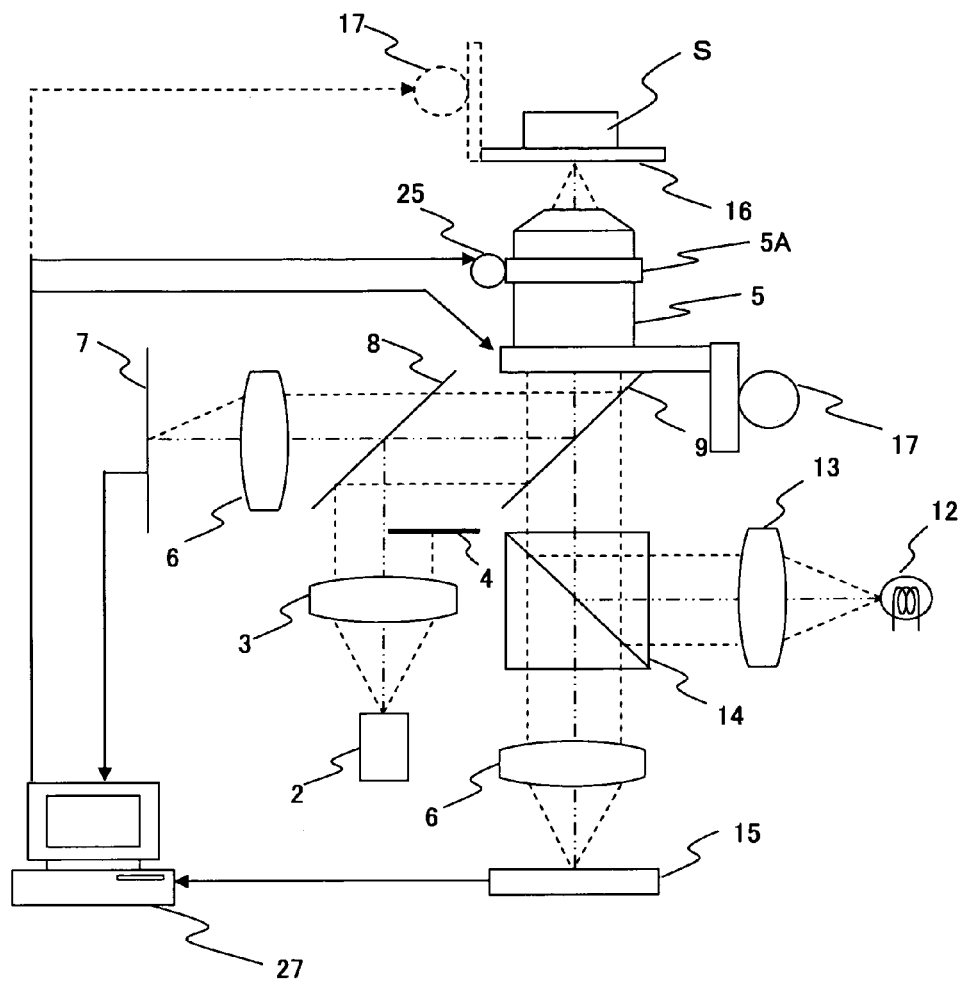
FIG. 1 shows a configuration example of the preferred embodiment of the microscope of the present invention.

A configuration example of the entire microscope in the preferred embodiment of the present invention is shown in FIG. 1. An objective 5 is disposed below a sample to observe, mounted on a stage 16. There is an objective holding member for holding this objective 5. The objective 5 is raised and dropped by a driver unit 17. The objective holding member comprises an objective identifying unit for identifying information characteristic to the objective by recognizing the type of the held objective 5.

The microscope of this preferred embodiment comprises an excitation light source 12, an illumination optical system 13 for leading the excitation light source 12 to the objective 5 and a specimen S and a fluorescent cube 14. The fluorescent cube 14 comprises a dichroic mirror, an excitation filter and a fluorescent filter in its inside. The fluorescent cube 14 and the filters accompanying it are exchangeable and attachable/detachable. The observation light of the specimen S that passes through the objective 5 is collected to form an image on an imaging device 15, such as CCD and the like, by a tube lens 6. Alternatively, the specimen S can be illuminated from the top using a transparent illumination light source and a transparent illumination system for collecting the illumination light of the light source on the specimen S, which are not shown in FIG. 1.

Beams emitted from a light source 2 to be used to measure the sample holding member, focusing and the like are reflected on a half-mirror 8 via a collimating lens 3 and on the dichroic mirror 9 disposed between the objective 5 and fluorescent cube 14 to illuminate the specimen S via the objectives 5. There is a shielding plate 4 between the collimating lens 3 and the half-mirror 8, which is positioned and almost conjugated with the pupil of the objective 5. The shielding plate 4 shields the half of the beams using the optic axis of the luminous flux of the collimating lens 3 as a boundary to restrict the luminous flux of the light source 2 to half.

The illumination light of the light source 2 returned from the specimen S is collected to form an image on a two-splitting sensor 7 by the tube lens 6 via the objective 5, the dichroic mirror 9 and the half-mirror 8. Since the half of the luminous flux is shielded by the shielding plate 4, the light returned from the specimen S passes through an optical path symmetric with the illumination light using the optic axis as the center and is projected on the two-splitting sensor 7. In this case, the splitting direction of the two-splitting sensor 7 and the splitting direction of the shielding plate 4 are disposed in relation to each other.

The objective 5 comprises a correction collar 5A and a correction collar driver unit 25 for driving this correction collar 5A. The objective identifying unit, the correction collar driver unit 25, driver unit 17, imaging device 15 and two-splitting sensor 7 are electrically connected to the operation device 27.

Although the configuration example shown in FIG. 1 is for an inverted microscope, it can be also an upright one in which the specimen S is observed from the top. The adjustment of the distance between the specimen S and the objective 5 to focus on the specimen S is not limited to the up-and-down motion of the object lens 5. Alternatively, an up-and-down motion driver unit can be provided on the stage 16, as shown by dotted lines.

The objective 5 is one with a correction collar. For it (1) a dry objective with a large numerical aperture in which various aberrations remarkably occur due to the uneven thickness of cover glass (the amount of correction is 0.11 mm to 0.23 mm), (2) an objective for thick glass supposed to use a glass petri dish or the like whose thickness widely differs, in a fairly wide range of 2 mm at maximum or (3) an objective for plastic supposed to use a plastic container whose thickness widely differs, in a fairly wide range of 2 mm at maximum is used.

Figure 2:
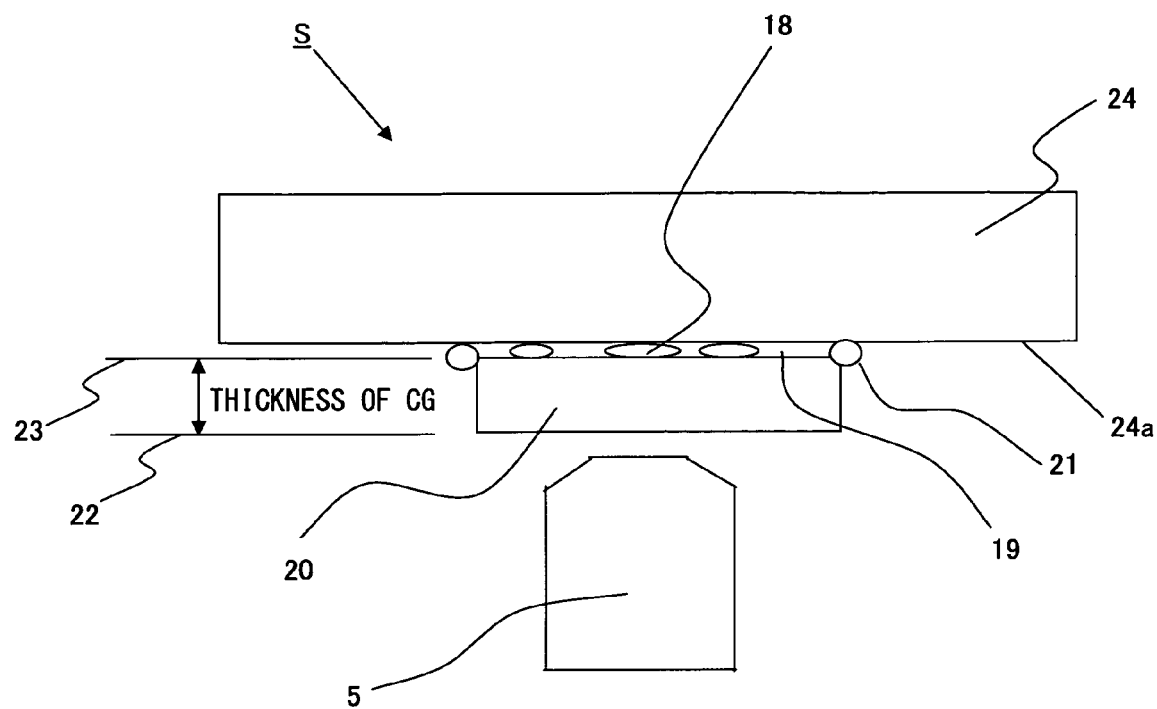
FIG. 2 shows the configuration of a general sample for a microscope.

FIG. 2 shows the enlarged specimen S and objective 5 of the microscope. There is a sample holding member (cover glass) 20 above the objective 5. There is a sample 18 between the sample holding member 20 and a piece of slide glass 24. The sample holding member 20 fixes the sample 18 on the slide glass 24 by a sealed agent 19 and a sealing agent 21, for fixing samples. In other words, the specimen S comprises the sample 18, the sealed agent 19, the sample holding member 20, the sealing agent 21 and the slide glass 24. The specimen S is not limited to the sample 18 fixed on the slide glass 24 and also includes the sample 18 contained in a petri dish and the like. A sample packaged in a container and the like is defined as a specimen S.

In this case, the objective 5 side surface and the sample 18 side surface for the sample holding member 20 are assumed to be a surface 22 touching the air of the sample holding member and a surface 23 touching the sample of the sample holding member, respectively. The space between the air-touching surface 22 and the sample-touching surface 23 is defined as the thickness of the sample holding member (cover glass) 20. This is mechanical thickness, which is defined as thickness CG.

Figure 3:
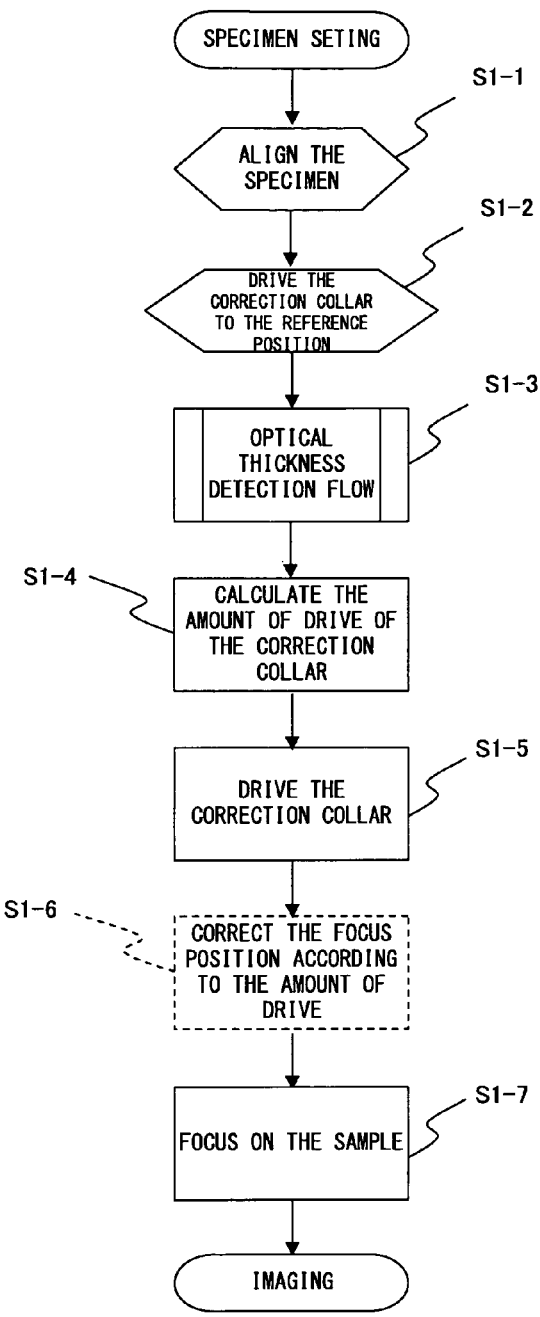
FIG. 3 shows the basic flow in the first preferred embodiment of the present invention.

FIG. 3 shows the basic flow in the first preferred embodiment of the present invention. Firstly, a sample is set on the stage 16. The observation place on the specimen S, that is, the sample 18 is moved on and aligned to the optic axis of the objective 5 (S1-1). Then, the correction collar of the objective 5 is driven to the reference position (S1-2).

Then, in order to detect the optical thickness of the holding member on the optic axis, a sub-flow, which is described later, is executed (S1-3). Then, a difference between the optical thickness of the sample holding member 20, obtained by the sub-flow and the optical thickness in the reference position of the correction collar is calculated. Then, the direction and amount of drive of the correction collar are calculated on the basis of this difference (S1-4).

Then, the correction collar is driven on the basis of the amount of drive of the calculated difference to correct aberration due to the sample holding member 20. The amount of correction of the focus position which is determined according to the amount of change of the focus position caused by the differential drive of the correction collar in conjunction with this is calculated to correct the focus position by the driver unit 17 (S1-6). The sample 18 is focused in the state where the aberration is corrected (S1-7). Then, the image of the sample 18 is formed and this flow is completed. In this case, if no especially quick operation is required, S1-6 can be also omitted. If the correction of the focus position by S1-6 is sufficient, S1-7 can be also omitted.

Figure 4A:
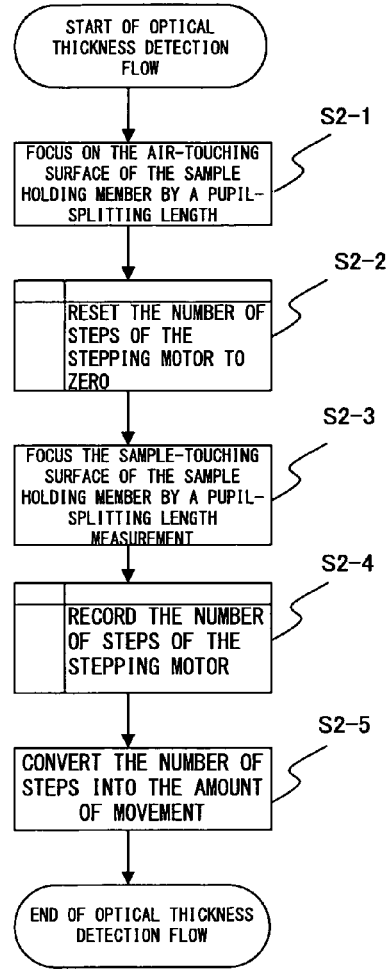
FIG. 4A shows an example of the thickness detection flow of the sample holding member (active).

FIG. 4A shows an example of the sub-flow for detecting the optical thickness of the sample holding member 20 to be used in S1-3 shown in FIG. 3. In this preferred embodiment, a distance difference between the air-touching surface 22 and sample-touching surface 23 of the holding member is measured by a pupil-splitting length measurement instrument described later and by the information, the optical thickness of the sample holding member 20 is detected.

The first process of this sub-flow begins from matching the focus position of the objective 5 with the air-touching surface 22 of the sample holding member 20 by the pupil-splitting length measurement instrument (S2-1). A stepping motor is used to drive the driver unit 17. In this state the count of the number of steps driven by the stepping motor is reset (set to zero) (S2-2). Then, the focus position of the objective 5 is aligned to the sample-touching surface 23 of the sample holding member 20 by driving the driver unit 17 (S2-3). The number of steps at this moment is recorded (S2-4). A value obtained by multiplying this number of steps by the amount of drive of the focus point per step becomes the optical thickness of the sample holding member 20 (S2-5).

An example in which the mechanical thickness of the cover glass as a reference is set to 0.17 mm is described below. If the actual mechanical thickness of the cover glass of a specimen S is 0.13 mm, it is converted to 0.11166 mm in optical thickness by the refractive index (ne=1.5255) of the cover glass. The reference thickness 0.17 mm is converted to 0.08539 mm, respectively. In this case, its optical difference becomes 0.02627 (its mechanical thickness becomes 0.044 mm). In the sub-flow for detecting an optical thickness, the optical thickness (mechanical thickness 0.13 mm) of the actual specimen S is calculated and the amount of drive of the correction collar is calculated on the basis of the difference (mechanical difference 0.04 mm) of the optical thickness against the reference cover glass (S1-7).

Then, the correction collar is matched with the actual thickness of the cover glass by driving the correction collar to correct aberration caused due to the thickness difference 0.02627 mm (mechanical difference 0.04 mm) as much as possible. At this moment, the space between the sample 18 and the objective 5 deviates from the state where the sample 18 is focused. The calculation of the amount of drive of the correction collar varies depending on the type of an objective and the amount of drive of the correction collar is calculated by a correction collar drive calculation data table or function which is characteristic to an objective. The correction collar drive calculation data table or function which is characteristic to an objective is stored in the operation device 27 and the thickness difference of the correction collar (mechanical difference 0.04 mm) and the amount of drive of the correction collar is calculated by the characteristic correction collar drive calculation data table or function.

The aberration of the objective 5 is changed by moving the correction collar and is calculated by the aberration correction calculation data table or function which is characteristic to an objective. This aberration correction calculation data table or function which is characteristic to an objective is stored in the operation device 27 and the amount of correction of the focus position is calculated by the thickness difference (mechanical difference 0.04 mm) of the correction collar and the aberration correction calculation data table or function.

FIG. 5 explains the mechanism of a pupil-splitting length measurement instrument used in the above-described flow. FIG. 5A shows the optical path in the state where the focus position of the objective 5 is matched with a reflection surface 1. Beams emitted from the light source 2 pass through the collimating lens 3 and the luminous flux is shielded and halved by the shielding plate 4 disposed to be almost conjugated with the pupil. As a result, the application angle of beams applied to the focus position from the objective 5 is restricted. That is, it becomes oblique illumination.

Beams reflected in the focus position pass through an optical path optic axis-symmetric with the path at the time of application and are collected by the objective 5. The reflection light emitted from the objective 5 passes through the half-mirror 8 and the tube lens 6 and reaches to the two-splitting sensor 7 disposed in the vicinity of the focus position of the tube lens 6. At this time, the splitting direction of the two-splitting sensor 7 and the splitting direction of the shielding plate 4 are disposed in relation to each other.

If a polarized beam splitter is used instead of the half-mirror 8 shown in FIG. 5, light from the light source 2 and light toward the two-splitting sensor 7 are separated by the difference of the polarization direction. The dichroic mirror 9 separates light toward the observation path from light toward the two-splitting sensor 7 by wavelength. It is preferable for the light source 2 used in this method to be a long wavelength light source, such as an infra-red laser and the like. This is because long wavelength light damages a living body sample 18 little and the long wavelength light can be easily separated from visible light generally used for observation by the dichroic mirror 9.

In FIG. 5A, since the reflection surface 1 is located in the focus position of the objective 5, the reflection light reaches almost one point of the two-splitting sensor 7. At this time, if the two-splitting sensor 7 is divided into sensors A and B, the sensors A and B are disposed in such a way that the respective intensity of light detected by the sensors A and B may become equal. The drawing indicated by a reference number 10 in FIG. 5A shows the state of the light receiving surface of the two-splitting sensor 7 which the reflection light from the reflection surface 1 reaches.

Figure 5B:
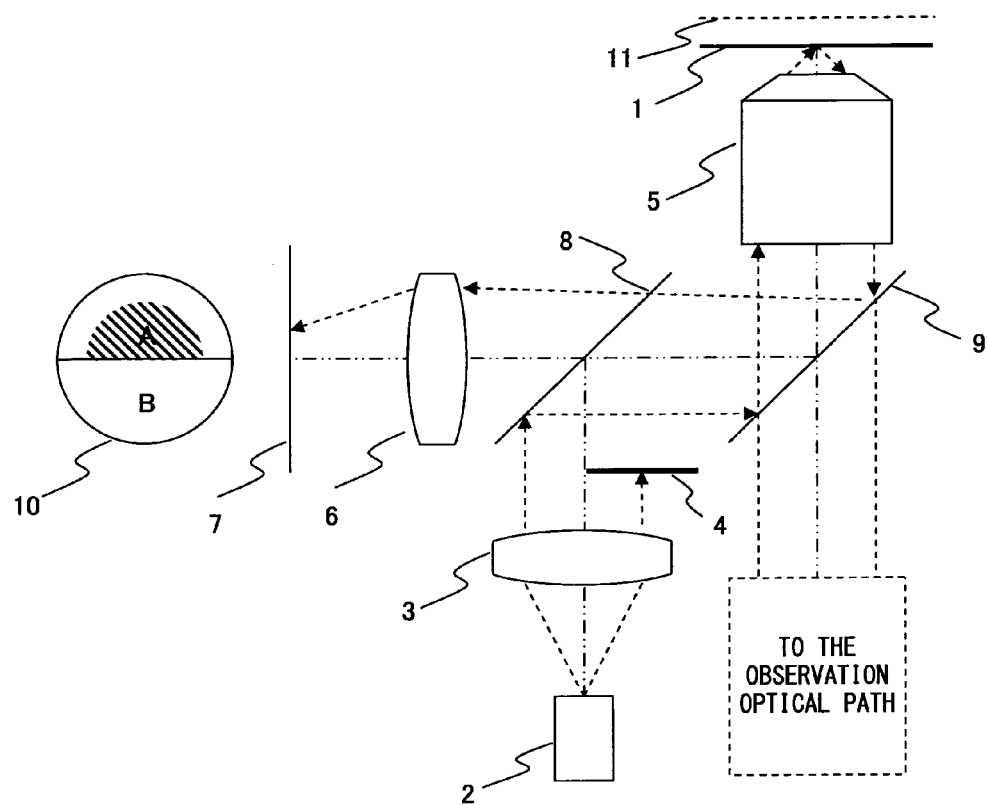
FIG. 5B explains a pupil splitting mechanism (2).

FIG. 5B shows an optical path in the case where the reflection surface 1 is positioned nearer the objective 5 than the focus surface 11 of the objective 5. If the reflection surface 1 is positioned nearer the objective 5 than the focus surface 11 of the objective 5, the reflection light from the reflection surface 1 is collected to form an image farther away than the focus position of the tube lens 6. Since the two-splitting sensor 7 is located nearer than a position in which the reflection light is collected to form an image, the image blurs on the light receiving surface 10 of the two-splitting sensor 7. However, since the luminous flux of the illumination light is restricted and halved by the shielding plate 4, the blurred image projected on the light receiving surface 10 of the two-splitting sensor 7 is halved. In FIG. 5B, this state is shown assuming that light from the reflection surface is applied only to the sensor A on the light receiving surface 10 of the two-splitting sensor 7.

Figure 5C:
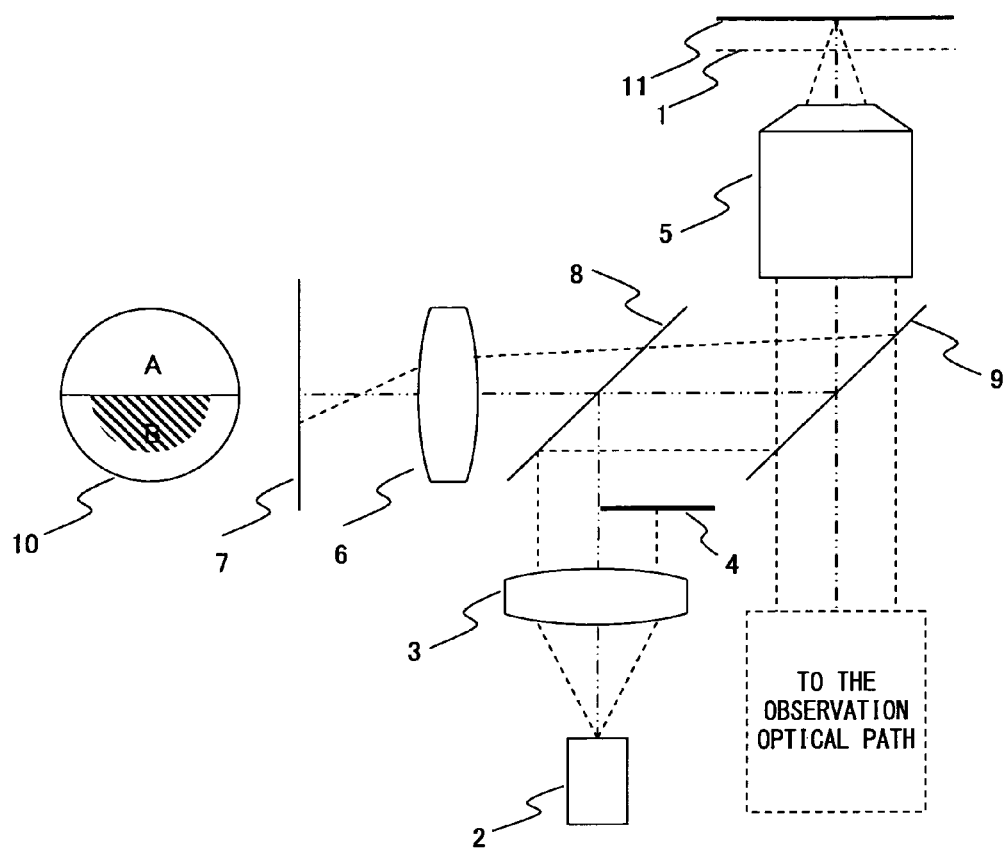
FIG. 5C explains a pupil splitting mechanism (3).

However, FIG. 5C shows an optical path in the case where the reflection surface 1 is positioned farther away from the objective 5 than the focus surface 11 of the objective 5. If the reflection surface 1 is positioned farther away from the objective 5 than the focus surface 11 of the objective 5, the reflection light from the reflection surface 1 is collected to form an image nearer than the focus position of the tube lens 6. However, since the two-splitting sensor 7 is located farther away than a position in which the reflection light is collected to form an image, the image blurs on the light receiving surface 10 of the two-splitting sensor 7. In this case, since the two-splitting sensor 7 is located farther away than the image forming position, the reflection light is applied only to the sensor B in a way the reverse of FIG. 5B.

As described above, if a pupil splitting length measurement instrument is used, it can be determined which the reflection surface 1 is located, on the focus surface of an objective, near the focus surface or far away from the focus surface. In this preferred embodiment of the present invention, which it is, the air-touching surface 22 or sample-touching surface 23 of the sample holding member, is detected using this property and the optical thickness of the sample holding member 20 is detected from the distance difference. A method for calculating the distance difference between the air-touching surface 22 and sample-touching surface 23 of the sample holding member is described below.

FIG. 6 is a graph showing a difference in received light intensity between the sensors A and B in the case where the pupil splitting method is applied to a piece of cover glass with the thickness of each of 0.16 mm and 0.17 mm. The horizontal and vertical axes represent the amount of drive [μm] of the focus surface 11 of an objective by the driver unit 17 and the normalized difference in received light intensity between the sensors A and B. However, as to the direction of the horizontal axis, a direction from the objective 5 toward the sample holding member 20 is defined to be positive.

As read from the graph shown in FIG. 6, there are several places where the respective received light intensity of the sensors A and B are equal. Specifically, there are several places where the vertical value is 0. Out of these places, a point where the curve crossing the 0-vertical value line upper-rightward from a negative area to a positive area indicates that the focus surface 11 of an objective coincides with the reflection surface. This is because if the reflection surface is located farther away than the focus surface 11 of the objective, the received light intensity of the sensor B is higher, in other words the vertical axis of the graph corresponds to the negative area. A point where this state is inverted to enter the positive area instead is the reflection surface.

For example, in the case of the graph of a piece of cover glass thick, indicated by the solid line, the graph crosses the 0-vertical value line upper-rightward in the position of −2 μm and crosses the 0-vertical value line upper-rightward in the vicinity of 109 μm again. The first reflection surface detected in the position of −2 μm from the reference position is the air-touching surface 22 of the sample holding member and the second reflection surface detected in the position of 109 μm from the reference position is the sample 18-touching surface 23 of the sample holding member. Since the distance difference between both surfaces is 111 μm, a product (169 μm=approximately 0.17 mm) obtained by multiplying this 111 μm by the refractive index (ne=1.5255) of the cover glass is detected as the thickness of the cover glass.

If the above description is expressed by an equation when the mechanical thickness of the sample holding member 20 being a piece of cover glass, the optical thickness of the sample holding member 20 and the refractive index of the sample holding member 20 are thickness CG, Dx and ne, respectively, thickness CG=Dx*ne is obtained. In the case of the cover glass thick indicated by the slid line, the optical thickness CG is calculated as follows.

Thickness $CG(169\ \mu m) = Dx(111\ \mu m) * ne(1.5255)$

In this preferred embodiment, the optical thickness Dx of the sample holding member 20 is used. The case of the earlier-described dry objective with a correction is explained below. In the case of a piece of cover glass 0.16 mm thick indicated by the dotted line, the distance difference between both surfaces is 100 μm. If the reference position of the correction collar is 0.17 mm, the optical thickness Dx of the sample holding member 20 and its difference become 100 μm and 11 μm, respectively. This difference of 11 μm becomes the amount of drive of the correction collar.

FIG. 4B shows a variation example of the thickness detection flow in the preferred embodiment of the present invention. As in FIG. 4A, in FIG. 4B, the air-touching surface 22 of the sample holding member is detected by a pupil-splitting length measurement instrument (S3-1) and the number of steps of a stepping motor used to drive the driver unit 17 is reset to zero (S3-2). Then, the sample 18 is focused by a contrast detection method (passive method) (S3-3). This method detects a position where the contrast of the image of such as a CCD disposed on the observation optical path and the like. Generally, since the sample 18 touches the sample holding member 20, it is regarded that the sample 18 and the sample-touching surface 23 of the sample holding member are located in the same place or very near. Then, the number of steps of the stepping motor at this moment is recorded (S3-4) and the number of steps is converted into the amount of movement by the driver unit 17 (S3-5). The number of steps of the stepping motor can also be the number of steps detected by an encoder and the like provided separately from the configuration of the present invention.

In the graph shown in FIG. 6, the inclination of the graph on the second reflection surface is less and the amount of change on the vertical axis is less than the inclination on the first reflection surface. This fact shows the reflection light from the sample-touching surface 23 of the sample holding member is weaker than the reflection light from the air-touching surface 23 of the sample holding member. This is because a refractive index differences between the sample holding member 20 and the sample 18 of the sealed agent 19 for fixing a sample is less than a refractive index differences between the air and the sample holding member 20. If the refractive index differences between the sample holding member 20 and the sample 18 or the sealed agent 19 for fixing a sample are very small, the reflection light becomes very weak and sometimes the sample-touching surface 23 cannot be detected by the pupil-splitting length measurement instrument. If the sample-touching surface 23 cannot be detected when detection is performed from the air-touching surface 22 of the sample holding member toward the sample-touching surface 23 side, by calculating a distance difference between the air-touching surface 22 of the sample holding member and the sample-touching surface 23 of the sample holding member using the earlier-described imaging device 15 and driving the correction collar based on this value according to the procedure shown in FIG. 4B, more various specimen S can be corresponded while the damage to the sample 18 by light is being suppressed to a minimum.

The imaging device 15 shown in FIG. 1 can be also used to form the image of the sample 18 and be also used to focus using the contrast detection method in the preferred embodiment of the present invention. Specifically, the output from the imaging device 15 can be used to determine the amount of adjustment of the correction collar of the objective 5 and the focus position by passing through the operation device.

The driver unit 17 can change the distance between the objective 5 and the sample 18 by moving the objective 5 or the stage 16 along the optic axis and is used to detect the reflection surface by the pupil-splitting length measurement instrument, to focus the sample 18 and further to correct the focus position according to the amount of change of the focus position caused by the drive of the correction collar.

The pupil-splitting length measurement instrument and the device for contrast detection in this configuration example are not only used in the preferred embodiment of the present invention but can be also used as an automatic focus point detection device for the sample 18. Specifically, according to the present invention, not only the correction collar but also the focus position can be adjusted in the same configuration.

Alternatively, a light source for transparent illumination and an observation optical path for naked-eye observation can be added to this configuration, which are not shown in FIG. 1.

According to this preferred embodiment, an imaging apparatus for automatically correcting various aberrations caused when the thickness of a medium for holding a sample, such as a piece of cover glass, a glass petri dish, a plastic container or the like interposed between an objective and a sample differs from a specified value is provided. By automating aberration correction, labor necessary for the aberration correction is widely reduced and even an observer without skill can accurately perform the aberration correction. Therefore, a good-quality image can be always rapidly obtained.

According to the method of this preferred embodiment, it is sufficient to detect only the thickness and refractive index of a sample holding member. Therefore, there is no need to obtain the image of a sample in order to correct aberration, the thickness can be detected by light with a wavelength less irritating to the sample little and automatic correction which damages the sample little becomes possible.

The Second Preferred Embodiment

Figure 7A:
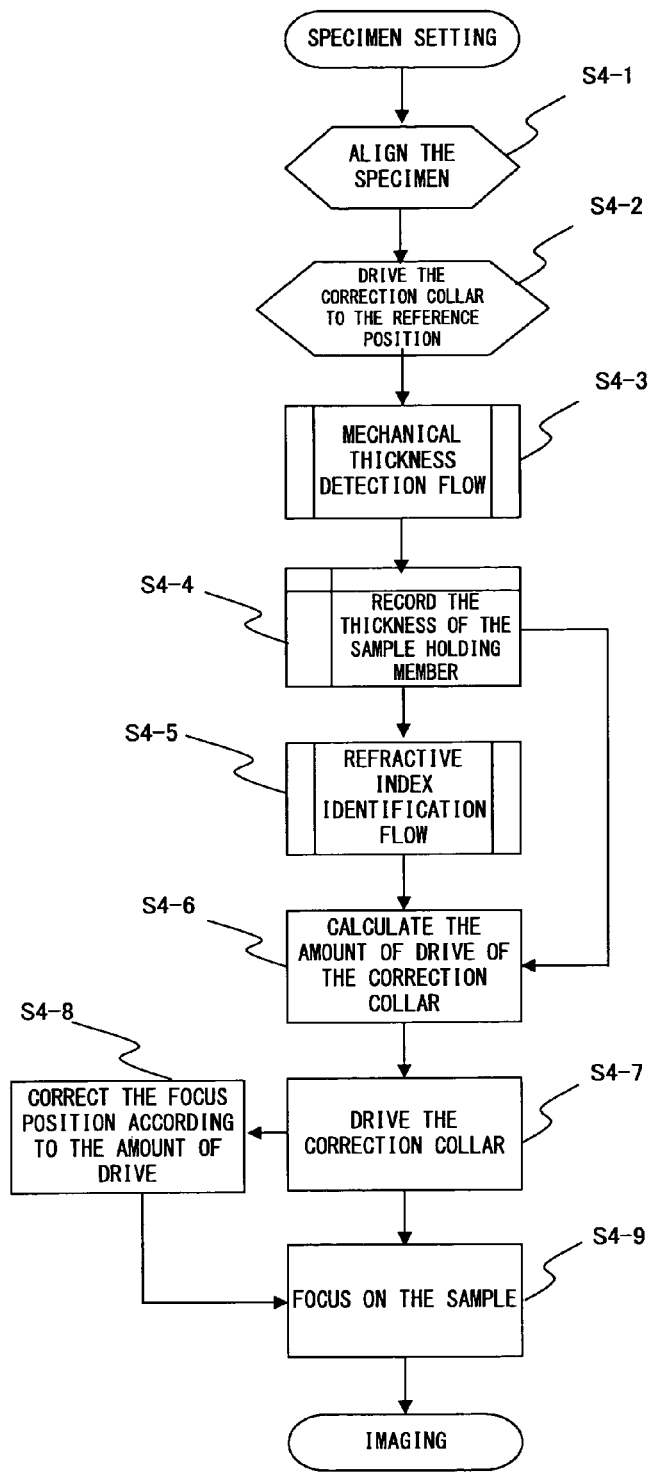
FIG. 7A shows the basic flow in the second preferred embodiment of the present invention.

FIG. 7A shows the basic flow in the second preferred embodiment of the present invention.

FIG. 7A shows the basic flow in the preferred embodiment of the present invention. In this preferred embodiment it is sufficient to obtain in advance information about a medium for holding the sample 18, such as a piece of cover glass, a glass petri dish, a plastic container or the like. Specifically, it is sufficient to obtain the mechanical thickness and refractive index of the sample holding member 29 before driving the correction collar. Although in the example shown in FIG. 7A, the mechanical thickness is obtained first, there is essentially no difference even if the refractive index is obtained first.

In the flow shown in FIG. 7A, as the initial setting, the sample is aligned (S4-1). Then, the correction collar is driven to the reference position (S4-2). Then, a sub-flow for detecting the mechanical thickness of the holding member of the sample 18 is executed (S4-3) and the mechanical thickness of the sample holding member 20 obtained by it is recorded (S4-4). Then, a sub-flow for identifying the refractive index of the sample holding member 20 is executed (S4-5). Then, by calculating the product of the mechanical thickness and refractive index of the sample holding member 20, the amount of drive of the correction collar is calculated (S4-6).

Then, the correction collar is driven on basis of the calculated amount of drive (S4-7) and aberration due to the sample holding member 20 is corrected. The amount of correction of the focus position which is determined according to the amount of change of the focus position caused by the drive of the correction collar in conjunction with this is calculated and the driver unit 17 corrects the focus position (S4-8). The sample 18 is focused in the state where aberration is corrected (S4-9) and the flow is completed. If no especially quick operation is required, S4-8 can be also omitted. If the correction of the focus position by S4-8 is sufficient, S4-9 can be also omitted.

In this case, the mechanical thickness means a difference between the air-touching surface 22 of a sample holding member and the sample holding member side surface 24a of a piece of slide glass.

Figure 7B:
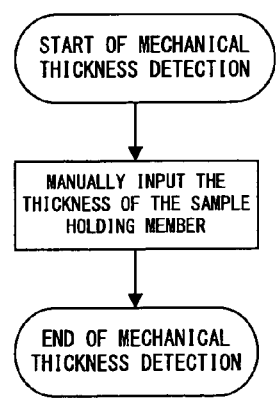
FIG. 7B shows the thickness detection flow in the case where the thickness of the sample holding member is known in advance.

FIG. 7B is a thickness detection flow in the case where the mechanical thickness of a sample holding member is known in advance. When the thickness is known, it is preferable to obtain the value from a personal computer (PC) connected to the operation device 27.

From here several preferred examples of the refractive index identification flow in the flow described with reference with FIG. 7A are described. The present sample holding members are largely grouped into two of glass make and plastic make. Therefore, if the material of a sample holding member is one of them, the refractive index is naturally known.

Figure 8:
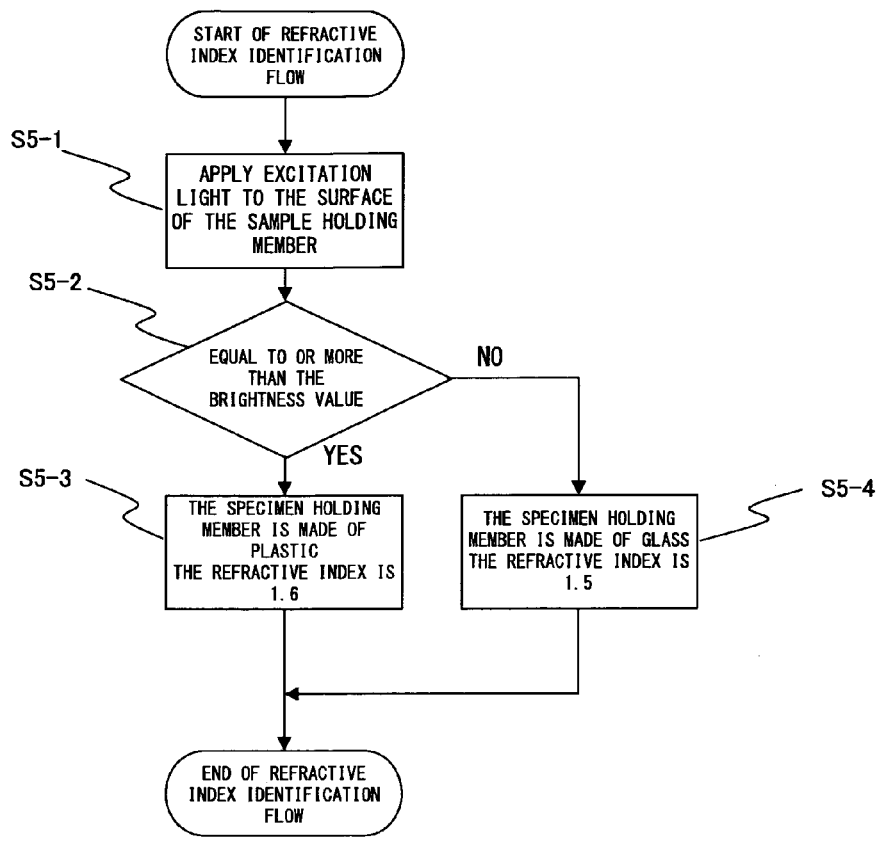
FIG. 8 shows the first preferred embodiment of the refractive index identification flow of the sample holding member.

In the refractive index identification flow shown in FIG. 8, attention is focused on the auto-fluorescence of a plastic. Firstly, excitation light is applied to the surface of a sample holding member (S5-1). At this moment, if the sample holding member is made of plastic, strong fluorescent light is emitted from the sample holding member itself. Since the surface of the sample holding member is focused by an objective in the previous flow, the image of the surface emitting the fluorescent light is formed on a CCD surface. The image of the surface of this sample holding member is formed by the CCD and the brightness distribution on the screen is calculated. In this case, for example, three dark parts are selected from the brightness distribution and the average brightness value of the three parts is calculated. Then, it is compared whether this average is equal to or more than a brightness value for distinguishing plastic from glass (S5-2). If it is equal to or more than this brightness value, the sample holding member is made of plastic and the refractive index is identified to be 1.6 (S5-3). If it is less than this value, the sample holding member is made of glass and the refractive index is identified to be (S5-4).

In this case, since the brightness value for distinguishing plastic from glass depends on the performance of an optical system leading from the objective to the CCD surface, it cannot be unconditionally determined. It is preferable to calculate an identification brightness value per each product by measuring the fluorescent brightness of a plastic or glass sample holding member when assembling the product.

By averaging the brightness values of three dark parts in the brightness distribution, the influence of the strong brightness of dust and the like can be removed.

However, if large dust covering the entire view field of the imaging device is attached to the sample holding member, very strong fluorescent brightness is detected. If the upper limit of brightness is predetermined to prevent an error, such an error can be detected.

Some of the above-described refractive index identifying units identify the refractive index of the sample holding member by recognizing its type obtained the above-described thickness detecting unit. If the sample holding member is a piece of general cover glass or a glass-bottom dish obtained by opening a hole on the bottom of a plastic container and covering it with a piece of cover glass, the refractive index ne is 1.5255±(ne=1.5255±0.0015) (ISO standard). Therefore, this value can be identified. Since a plastic petri dish used to culture cells and so on is generally made of polyethylene, the refractive index can be identified to be (ne=1.59).

Figure 9:
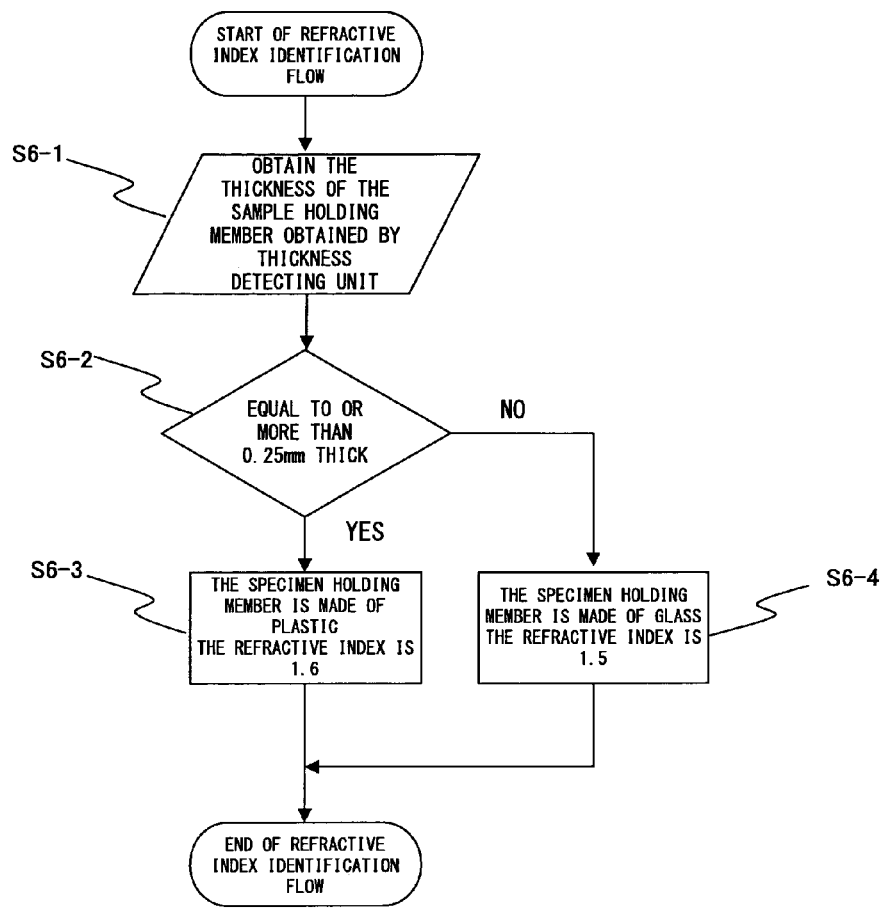
FIG. 9 shows the second preferred embodiment of the refractive index identification flow of the sample holding member.

In the refractive index identification flow shown in FIG. 9, attention is focused on a difference in thickness between general plastic and glass sample holding members. Since a plastic is thin and it is difficult to mold it. Firstly, the thickness of the sample holding member that is obtained in the previous step is obtained S6-1). The material of the sample holding member is determined whether or not the thickness is equal to or more than 0.25 mm (S6-2). If the thickness is equal to or more than 0.25 mm, the sample holding member is made of plastic and the refractive index can be identified to be (S6-3). If it is less than 0.25 mm, the sample holding member is made of glass and the refractive index can be identified to be (S6-4).

However, it can be also considered that a thin plastic sample holding member is developed and used in the future. Therefore, it is preferable to display the material of a sample holding member by another display method after calculating the refractive index so that a user can check it.

Figure 10:
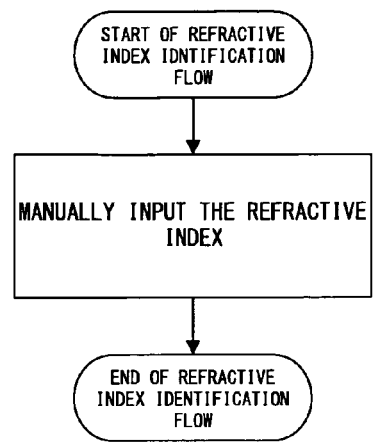
FIG. 10 shows the thickness detection flow in the case where the refractive index of the sample holding member is known in advance.

FIG. 10 is the thickness detection flow in the case where the refractive index of the sample holding member is known in advance. It can be also used when a sample holding member which is different from a usual one is used. In this case, the refractive index is manually inputted.

By adopting the above configuration, an apparatus for automatically correcting various aberrations caused when the thickness and refractive index of a medium for holding the sample 18, such as a piece of cover glass, a glass petri dish, a plastic container or the like interposed between an objective and the sample 18 can be provided.

What is claimed is:

1. An optical apparatus provided with an objective with a correction collar for correcting an aberration due to an error in an optical thickness of a sample holding member, said optical apparatus comprising:
   an optical thickness detecting unit which detects the optical thickness of the sample holding member;
   an operating unit which calculates an amount of drive of the correction collar for correcting the aberration, based on the optical thickness of the sample holding member detected by the optical thickness detecting unit;
   a driver unit which drives the correction collar, based on the amount of drive of the correction collar calculated by the operating unit;
   a focusing mechanism which changes a distance between the objective and a sample;
   an image sensor which forms an image of the sample that passes through the objective; and
   an identifying unit which identifies characteristic information about the objective,
   wherein the operating unit calculates the amount of drive of the correction collar for correcting the aberration, based on a database or function characteristic to the objective identified by the characteristic information and based on the optical thickness of the sample holding member which is detected by the optical thickness detecting unit.

2. The optical apparatus according to claim 1, wherein the focus mechanism changes a distance between the sample and the objective, according to an amount of change of a focus position caused by driving of the correction collar.

3. The optical apparatus according to claim 1, wherein the optical thickness detecting unit is provided with an input device for inputting a mechanical thickness of the sample holding member.

4. An optical apparatus provided with an objective with a correction collar for correcting an aberration due to an error in an optical thickness of a sample holding member, said optical apparatus comprising:
   an optical thickness detecting unit which detects the optical thickness of the sample holding member;
   an operating unit which calculates an amount of drive of the correction collar for correcting the aberration, based on the optical thickness of the sample holding member detected by the optical thickness detecting unit;
   a driver unit which drives the correction collar, based on the amount of drive of the correction collar calculated by the operating unit;
   a focusing mechanism which changes a distance between the objective and a sample; and
   an image sensor which forms an image of the sample that passes through the objective,
   wherein the optical thickness detecting unit comprises a pupil-splitting length measurement instrument including:
      a light source;
      a shielding plate which shields, at a pupil-conjugate position of the objective, half of a luminous flux of beams emitted from the light source;
      the objective, which generates oblique illumination from the beam passing through the shielding plate, and which directs the oblique illumination to the sample holding member; and
      a two-splitting sensor which detects reflection light from the sample holding member, the two-splitting sensor being placed at a position conjugate to a focus position of the objective, and divided into a first sensor and a second sensor with respect to an optical axis,
   wherein the optical thickness detecting unit detects a first surface of the sample holding member touching the air and a second surface of the sample holding member touching the sample, based on a difference in intensity of light detected by the first and second sensors, the difference being obtained using the pupil-splitting length measurement instrument, and wherein the optical thickness detecting unit obtains the optical thickness of the sample holding member by calculating an amount of relative drive of the objective to the sample between the first and second surfaces.

5. The optical apparatus according to claim 4, wherein the pupil-splitting length measurement instrument is provided with an automatic focus mechanism.

6. An optical apparatus provided with an objective with a correction collar for correcting an aberration due to an error in an optical thickness of a sample holding member, said optical apparatus comprising:
   an optical thickness detecting unit which detects the optical thickness of the sample holding member;
   an operating unit which calculates an amount of drive of the correction collar for correcting the aberration, based on the optical thickness of the sample holding member detected by the optical thickness detecting unit;

a driver unit which drives the correction collar, based on the amount of drive of the correction collar calculated by the operating unit;

a focusing mechanism which changes a distance between the objective and a sample; and an image sensor which forms an image of the sample that passes through the objective, wherein the optical thickness detecting unit comprises a pupil-splitting length measurement instrument including:

a light source;

a shielding plate which shields, at a pupil-conjugate position of the objective, half of a luminous flux of beams emitted from the light source;

the objective, which generates oblique illumination from the beam passing through the shielding plate, and which directs the oblique illumination to the sample holding member; and a two-splitting sensor which detects reflection light from the sample holding member, the two-splitting sensor being placed at a position conjugate to a focus position of the objective, and divided into a first sensor and a second sensor with respect to an optical axis, wherein the optical thickness detecting unit (i) detects a first surface touching the air of the sample holding member based on a difference in intensity of light detected by the first and second sensors, the difference being obtained using the pupil-splitting length measurement instrument, (ii) detects a second surface touching the sample of the sample of the sample holding member by focusing on the sample with a contrast detection method, and (iii) obtains the optical thickness of the sample holding member by calculating an amount of relative drive of the objective to the sample between the first and second surfaces.

7. An optical apparatus provided with an objective with a correction collar for correcting an aberration due to an error in an optical thickness of a sample holding member, said optical apparatus comprising:

an optical thickness detecting unit which detects the optical thickness of the sample holding member;

an operating unit which calculates an amount of aberration correction, based on the optical thickness of the sample holding member detected by the optical thickness detecting unit;

a driver unit which drives the correction collar, based on the amount of aberration correction calculated by the operating unit;

a focusing mechanism which changes a distance between the objective and a sample; and an image sensor which forms the image of the sample that passes through the objective, wherein the optical thickness detecting unit comprises:

a mechanical thickness detecting unit which detects a mechanical thickness of the sample holding member; and a refractive index identifying unit which identifies a refractive index of the sample holding member;

wherein the optical thickness of the sample holding member is calculated based on the mechanical thickness and the refractive index of the sample holding member.

8. The optical apparatus according to claim 7, wherein the refractive index identifying unit comprises at least a fluorescent filter, an excitation filter and a dichroic mirror, and wherein the refractive index identifying unit selects a material of the sample holding member which is plastic or glass by detecting auto-fluorescent light when excitation light is applied to the sample holding member.

9. The optical apparatus according to claim 7, wherein, when a material of the sample holding member is made of one of plastic and glass, the refractive index identifying unit determines that the material is made of one of plastic and glass, based on the mechanical thickness of the sample holding member obtained by the mechanical thickness detecting unit.

10. The optical apparatus according to claim 7, further comprising an input unit which enables a user to directly input the refractive index of the sample holding member to the refractive index identifying unit.

11. An optical apparatus provided with an objective with a correction collar for correcting an aberration due to an error in an optical thickness of a cover glass, said optical apparatus comprising:

a focusing mechanism which changes a distance between the objective and a sample;

an optical thickness detecting unit which detects the optical thickness of the cover glass;

an operating unit which calculates an amount of drive of the correction collar for correcting the aberration, based on the optical thickness of the cover glass detected by the optical thickness detecting unit;

a driver unit which drives the correction collar, based on the amount of drive of the correction collar calculated by the operating unit; and an image sensor which forms the image of the sample that passes through the objective, wherein:

the focusing mechanism detects a first focus position on which an objective side surface of the cover glass is focused and a second focus position on which a sample surface of the cover glass is focused, the optical thickness detecting unit calculates the optical thickness of the cover glass based on a difference between the first and second focus positions, the operating unit calculates the amount of drive of the correction collar based on the difference between the first and second focus positions obtained by the focusing mechanism, and the driver unit drives the correction collar based on the amount of drive of the correction collar calculated by the operating unit.

12. A method for imaging a sample using an optical apparatus provided with an objective with a correction collar for correcting an aberration due to an error in an optical thickness of a sample holding member, the method comprising:

detecting the optical thickness of the sample holding member by using a pupil-splitting length measurement instrument including (i) a light source, (ii) a shielding plate which shields, at a pupil-conjugate position of the objective, half of a luminous flux of beams emitted from the light source, (iii) the objective, which generates oblique illumination from the beam passing through the shielding plate, and which directs the oblique illumination to the sample holding member, and (iv) a two-splitting sensor which detects reflection light from the sample holding member, the two-splitting sensor being placed at a position conjugate to a focus position of the objective, and divided into a first sensor and a second sensor with respect to an optical axis;

calculating an amount of drive of the correction collar for correcting the aberration, based on the detected optical thickness;

driving the correction collar, based on the calculated amount of drive of the correction collar;
changing a distance between the objective and a sample; and
forming an image of the sample that passes through the objective.

13. A method for imaging a sample using an optical apparatus provided with an objective with a correction collar for correcting an aberration due to an error in an optical thickness of a sample holding member, the method comprising:
detecting the optical thickness of the sample holding member;
calculating an amount of drive of the correction collar for correcting the aberration, based on the detected optical thickness;
driving the correction collar, based on the calculated amount of drive of the correction collar;
changing a distance between the objective and a sample; and
forming an image of the sample that passes through the objective,
wherein the detecting of the optical thickness of the sample holding member is carried out using a pupil-splitting length measurement instrument,
wherein the pupil-splitting length measurement instrument includes: (i) a light source, (ii) a shielding plate which shields, at a pupil-conjugate position of the objective, half of a luminous flux of beams emitted from the light source, (iii) the objective, which generates oblique illumination from the beam passing through the shielding plate, and which directs the oblique illumination to the sample holding member, and (iv) a two-splitting sensor which detects reflection light from the sample holding member, the two-splitting sensor being placed at a position conjugate to a focus position of the objective, and divided into a first sensor and a second sensor with respect to an optical axis; and
wherein the detecting of the optical thickness of the sample holding member comprises:
detecting a first surface of the sample holding member touching the air and a second surface of the sample holding member touching the sample, based on a difference in intensity of light detected by the first and second sensors, and
calculating an amount of relative drive of the objective to the sample between the first and second surfaces,
wherein the difference in intensity of light detected by the first and second sensors is obtained by utilizing the pupil-splitting length measurement instrument.

14. A method for imaging a sample using an optical apparatus provided with an objective with a correction collar for correcting an aberration due to an error in an optical thickness of a sample holding member, the method comprising:
detecting the optical thickness of the sample holding member;
calculating an amount of drive of the correction collar for correcting the aberration, based on the detected optical thickness;
driving the correction collar, based on the calculated amount of drive of the correction collar;
changing a distance between the objective and a sample; and
forming an image of the sample that passes through the objective,
wherein the detecting of the optical thickness of the sample holding member is carried out using a pupil-splitting length measurement instrument,
wherein the pupil-splitting length measurement instrument includes: (i) a light source, (ii) a shielding plate which shields, at a pupil-conjugate position of the objective, half of a luminous flux of beams emitted from the light source, (iii) the objective, which generates oblique illumination from the beam passing through the shielding plate, and which directs the oblique illumination to the sample holding member, and (iv) a two-splitting sensor which detects reflection light from the sample holding member, the two-splitting sensor being placed at a position conjugate to a focus position of the objective, and divided into a first sensor and a second sensor with respect to an optical axis; and
wherein the detecting of the optical thickness of the sample holding member comprises:
detecting a first surface of the sample holding member touching the air based on a difference in intensity of light detected by the first and second sensors,
focusing the sample so as to detect a second surface of the sample holding member touching the sample by a contrast detection method, and
calculating an amount of relative drive of the objective to the sample between the first and second surfaces,
wherein the difference in intensity of light detected by the first and second sensors is obtained by utilizing the pupil-splitting length measurement instrument.

15. A method for imaging a sample using an optical apparatus provided with an objective with a correction collar for correcting an aberration due to an error in an optical thickness of a sample holding member, the method comprising:
detecting the optical thickness of the sample holding member;
calculating an amount of aberration correction, based on the optical thickness;
driving the correction collar, based on the amount of aberration correction;
changing a distance between the objective and a sample; and
forming an image of the sample that passes through the objective,
wherein the detecting of the optical thickness of the sample holding member comprises:
detecting a mechanical thickness of the sample holding member, and
detecting a refractive index of the sample holding member.

16. The imaging method according to claim 15, wherein the detecting of the refractive index of the sample holding member comprises detecting auto-fluorescent light of the sample holding member.

17. The imaging method according to claim 15, wherein the detecting of the refractive index of the sample holding member comprises inferring a material from the detected mechanical thickness of the sample holding member.

* * * * *